United States Patent
Fischer et al.

(10) Patent No.: US 8,100,156 B2
(45) Date of Patent: Jan. 24, 2012

(54) CYLINDRICAL CUTTER WITH HELICAL CUTTING LINE

(75) Inventors: Roland Fischer, Dresden (DE); Christian Gottlöber, Dresden (DE); Klaus Rehm, Dresden (DE); Wolfgang Butter, Waldkirchen (DE)

(73) Assignee: Ledermann GmbH & Co. KG, Horb a. N. (DE)

( * ) Notice: Subject to any disclaimer, the term of this patent is extended or adjusted under 35 U.S.C. 154(b) by 113 days.

(21) Appl. No.: 12/294,063

(22) PCT Filed: Mar. 23, 2006

(86) PCT No.: PCT/DE2006/000553
§ 371 (c)(1),
(2), (4) Date: Sep. 25, 2009

(87) PCT Pub. No.: WO2007/107129
PCT Pub. Date: Sep. 27, 2007

(65) Prior Publication Data
US 2010/0006181 A1  Jan. 14, 2010

(51) Int. Cl.
*B27C 1/00* (2006.01)
*B26D 1/12* (2006.01)
(52) U.S. Cl. .............. 144/221; 407/59; 407/63
(58) Field of Classification Search ........... 144/218, 144/221, 241; 407/53, 59, 63
See application file for complete search history.

(56) References Cited

U.S. PATENT DOCUMENTS

| | | | | |
|---|---|---|---|---|
| 2,129,417 A | * | 9/1938 | Gase | 407/54 |
| 2,753,901 A | * | 7/1956 | Stauffer | 144/221 |
| 4,485,858 A | * | 12/1984 | Cecchi | 144/221 |
| 4,936,361 A | * | 6/1990 | Mercier et al. | 144/221 |
| 4,967,855 A | * | 11/1990 | Moser | 175/394 |
| 5,323,823 A | * | 6/1994 | Kopras | 144/219 |
| 7,204,663 B2 | * | 4/2007 | Dov et al. | 407/53 |
| 7,377,732 B2 | * | 5/2008 | Andoh et al. | 409/74 |
| 7,708,038 B1 | * | 5/2010 | Stewart | 144/117.1 |

FOREIGN PATENT DOCUMENTS

| | | |
|---|---|---|
| CH | 161618 A | 5/1933 |
| EP | 0155216 A | 9/1985 |
| EP | 0316105 A | 5/1989 |
| JP | 61197116 A | 9/1986 |
| JP | 06190644 A | 7/1994 |
| JP | 06190645 A | 7/1994 |
| SU | 1407741 A | 7/1988 |

* cited by examiner

*Primary Examiner* — Shelley Self
(74) *Attorney, Agent, or Firm* — Gudrun E. Huckett

(57) ABSTRACT

A cylindrical cutter for machining wood, wooden materials and plastics, has at least one helical cutting edge, wherein a helix angle $\lambda_s$ of the at least one cutting edge is in a range of 70° to close to 90°, a rake angle $\gamma_r$ of the at least one cutting edge between a tool orthogonal plane $P_o$ and a rake face $A_\gamma$—measured in a tool reference plane $P_r$—is at least 5°, and a wedge angle $\beta_r$ between the rake face $A_\gamma$ and a flank $A_\alpha$—measured in the tool reference plane $P_r$—is 45° to 65°.

13 Claims, 4 Drawing Sheets

CYLINDRICAL CUTTER WITH HELICAL CUTTING LINE

BACKGROUND OF THE INVENTION

The invention concerns a cylindrical cutter comprising one or several helically extending cutting edges for machining wood, wooden materials and plastics as well as a method for its manufacture.

For peripheral milling of wood, wooden materials, plastics and similar materials, rotating tools with several cutting edges are used, including cylindrical cutters with at least one cutting edge that extends helically. The cutting edges have an angular momentum about the axis of the cutter. These cutters have inter alia the advantage that, in comparison to cutters whose cutting edges extend parallel to the cutter axis, they run more smoothly because the cutting edge engagement and the cutting force change do not occur so suddenly.

Primarily, the helix angle $\lambda_s$ of the tool is in the range of 0° to 25°. Frequently used are end milling cutters or cylindrical cutters having an angular moment of the cutting edges in accordance with this angle.

According to WO 98/04231, this slant angle (helix angle) is between 40° and 60°, preferably at 45°. EP 0 155 216 discloses 45° as well as 50° to 60°. According to JP 61197116 AA (Abstract) it is also between 40° and 60°.

In case of such helix angles each cutting edge impacts in most applications also once per revolution onto the surface to be processed. This impact causes as a result of the high rotary speed of modern wood processing machines significant noise levels at high frequency in accordance with the rotary speed and number of cutting edges. Moreover, because of this impact a compression of the surface results. This has the effect that the wood, in particular when treated with aqueous media, will swell and subsequently must be post-ground. As a result of the kinematic chip removal principle, partially large-volume chips result that with the entire chip collective must be accelerated to cutting speed and thrown off tangentially. This causes high kinetic energies of the removed chips with diffuse directions of action. Accordingly, for suction removal and dust removal a high energetic and technical expenditure is required. The problem of complete removal of chips and dust has not been resolved to this day in a satisfactory way.

CH-PS 161 618 discloses a cylindrical cutter with a helically extending cutting edge for the cutter spindle of a planing machine. The figure shows that the cutting edge has a helix angle of >60°. A practical application of a cutter spindle designed in this way is not known to the applicant.

Obviously, it is not easy to provide a cylindrical cutter with a large helix angle or high overlap rate of the cutting edge with which high quality cuts can be performed. Also, the manufacture, grinding and regrinding of the cutting edges becomes more and more difficult as the helix angle increases.

It is an object of the invention to provide a cylindrical cutter with a high overlap rate of the helical cutting edges and means for its manufacture with which high quality machining of wood is possible.

SUMMARY OF THE INVENTION

According to the invention this object is solved in that the helix angle $\lambda_s$ of the tool (according to DIN 6581) of at least one cutting edge is in the range of 70° to close to 90°, in particular 80° to 88°, and the rake angle $\gamma_r$ between the tool orthogonal plane $P_o$ and the rake face $A_\gamma$—measured in the tool reference plane $P_r$—is at least 5°.

Tests have shown that with a cylindrical cutter according to the present invention an excellent processing of wood is possible. An excellent surface is obtained and the tool runs smoothly. Surprisingly, long-fiber chips are peeled off that, as a spin-off product, can be used in pulp production. Obviously, this result is not only based on the large helix angle of the cutting edge but also to the assignment of unusual cutting edge angles.

A comparison to DIN 6581 shows that the tool angles of the cutting edge (rake angle, wedge angle, relief angle) are usually not measured in the tool reference plane $P_r$ but in one of the other planes $P_o$, $P_s$ etc. the rake angle $\gamma$ of the tool is accordingly always the angle between the rake face $A_\gamma$ and the tool reference plane $P_r$ (see 4.1.2). The thus defined angle cannot be represented in the plane $P_r$.

The tool can be referred to as a peripheral milling cutter with an extremely large helix angle $\lambda_s$ of the tool. Accordingly, a completely changed application behavior results. This tool construction can no longer be correlated with conventional peripheral cylindrical cutters. The cutting force direction is no longer primarily exerted in a tangential direction but is axial in important parts. Mostly each cutting edge runs several times about the circumference of the tool. Upon rotation of the tool about its usual axis of rotation that corresponds in this connection to the helix axis, two movements that overlay one another are carried out: the tangential movement causes a cut with extreme pulling action and the chip is therefore primarily peeled off laterally and transported away.

For a regular peripheral cutter it is obvious to measure and represent the cutting angle according to the aforementioned DIN. For the cylindrical cutter according to the invention with its extremely large helix angle of the tool and primarily axially acting cutting action the quality of the cutting edge can be recognized in the simplest way based on the illustration of the cutting edge angles in the tool reference plane $P_r$, i.e., in deviation from the DIN standard.

When comparing in this respect the FIG. 2 of CH-PS 161 618 and the subsequent embodiment, the differences of both solutions become especially apparent. Both longitudinal sections correspond to a possible tool reference plane $P_r$. The longitudinal section of the cylindrical cutter according to CH-PS 161 618 shows that obviously relative to this plane a negative rake angle has been selected. With such a rake angle the chip will be forced to the side and (minimally) forced in the direction of the cut surface. The wood is sheared off in the lateral direction and not peeled off.

FIG. 2 of the subsequent embodiment shows moreover that the cutting edge according to the invention can be formed with a large wedge angle $\beta_r$—preferably 45° to 65°—and therefore is very wear-resistant relative to the primarily laterally occurring loads. For the conventional small relief angles there remains sufficient latitude for optimizing the rake angle $\gamma_r$ above 5°.

In the shown embodiment, the correlation between the angles that are measured in the tool reference plane $P_r$ and the angles that are measured in the tool orthogonal plane $P_o$ in accordance with DIN standard is provided.

By means of several parallel extending cutting edges an especially smooth running and a high productivity are achieved. Moreover, in case of several cutting edges it is possible to make one of the outer diameters d of at least one of the cutting edges greater than that of the others. The cutting edge with the great diameter provides the surface quality. The cutting edges with smaller diameter ream—without relevance with regard to the surface quality of the finished surface—a part of the material of the layer to be cut off and reduce thus the wear of the cutting edge with the greatest diameter.

In a preferred embodiment a cutting edge is in the form of a helically bent blade that is detachable from the tool base member wherein the blade is positioned in grooves by means of helically bent spacers or lateral collars on the tool base member.

For attaching the detachable parts on the base member the cutting edge and the spacers are axially clamped relative to one another or secured by opposite rotation of the cutting edge ends. Also it is possible to produce first the initially detachable cutting edge in a finish-ground state and to secure it by gluing, by soldering or other material bonding on the tool base member.

The tool diameter, the helix angle of the tool, the number of helical cutting lines that in accordance with the present invention are interposed and the angles at the cutting edges can be varied. The material for cutting edge and base member can be optimized independent from one another.

A special advantage of this solution resides in facilitating grinding and regrinding of the cutting edge. As a result of the large helix angle there is normally little space available for grinding tools between the turns of the cutting edges. This intermediate space is instantly enlarged when several parallel extending cutting edges are provided and are ground sequentially wherein for grinding only one cutting blade is fastened on the tool base member.

Also, the detachable cutting blade can be ground and reground by means of a grinding spindle separate from the tool base member, even on a grinding spindle with a small helix angle, i.e., with a larger intermediate space between the turns.

As a result of the helix angle of the cutting edge a significant axial component of the cutting force is generated. For adjustment of the cutting forces to different materials, in particular composite materials, it is advantageous to adjust the helix angle of the cutting edges to the individual layers of the material. In this way, cracking or chipping at the edges of the workpiece as a result of the cutting forces is prevented. The adaptation of the helix angle of the tool can be realized by application or grinding of different cutting edge shapes within a tool part or, advantageously, by assembling the tool from partial tools with different tool helix angles.

The latter is possible primarily in the known variant that two partial tools of the same outer diameter but with opposite pitch (right-handed and left-handed) are combined to a cylindrical cutter.

The use of chip breakers on the rake face has also been found to be beneficial in connection with the tools according to the invention.

The advantages of the cylindrical cutter according to the invention reside mainly in the constructively caused continuous cutting action as a result of the permanent cutting edge engagement and the significant change of the geometry of action relative to the orthogonal geometries. In this way an almost constant cutting force level and therefore a reduced noise emission are achieved. Additionally, a strong axial directional orientation of the resulting chips is provided, and the thus correlated possibility of an ordered removal and collection of chips is possible. With regard to surface quality great compression of the surface-near layers of the cut surface are prevented. The occurring forces are made much more uniform and their direction of action is almost perpendicular to the feed direction. In this way, it can be received by the workpiece support.

As a result of the contour of the tool a very good strength of the tool is provided so that a special suitability for HSC machining is present. The risk of detachment of individual parts of the tool and the thus resulting risk of imbalance is not present in the design according to the invention.

The manufacture of the tools according to the invention requires application of a helical cutting edge of a great stretched length and constant curvature. This is not possible with conventional manufacturing processes or possible only with significant expenditure.

In conventional manufacture the cutting edge is to be produced by material-removing methods from a blank made from cutting edge material; this causes high expenditure in regard to labor and cutting edge material. A detachable cutting edge can be advantageously produced separate from the tool base member.

In a further method according to the invention, on a cylindrical base member of a carrier material a cutting edge of cutting edge material is applied in a helical shape and subsequently ground to the desired cutting edge shape.

The application of the cutting edge material can be realized by gluing, by soldering or by build-up welding. For this purpose, the material is preferably preshaped during the build-up welding process in the liquid phase so that after solidification only a minimal expenditure for the material-removing fine machining and grinding of the cutting edge are required. This preshaping can be realized by molds that shape the cutting material in the liquid phase and during the transition into the solid phase stabilize the predetermined shape. Advantageously, the molds are made of ceramic material or other high-temperature resistant materials wherein the cutting edge material to be built up is supplied in the form of wire, powder or rods and is melted in the cavity that provides shaping. The relative movement between mold and tool shapes the rough shape of the helical cutting edge wherein solidification of the cutting edge material can be realized by heat dissipation into the tool body and also by an additional cooling action of the shaping part of the mold.

DESCRIPTION OF PREFERRED EMBODIMENTS

Figure 1:
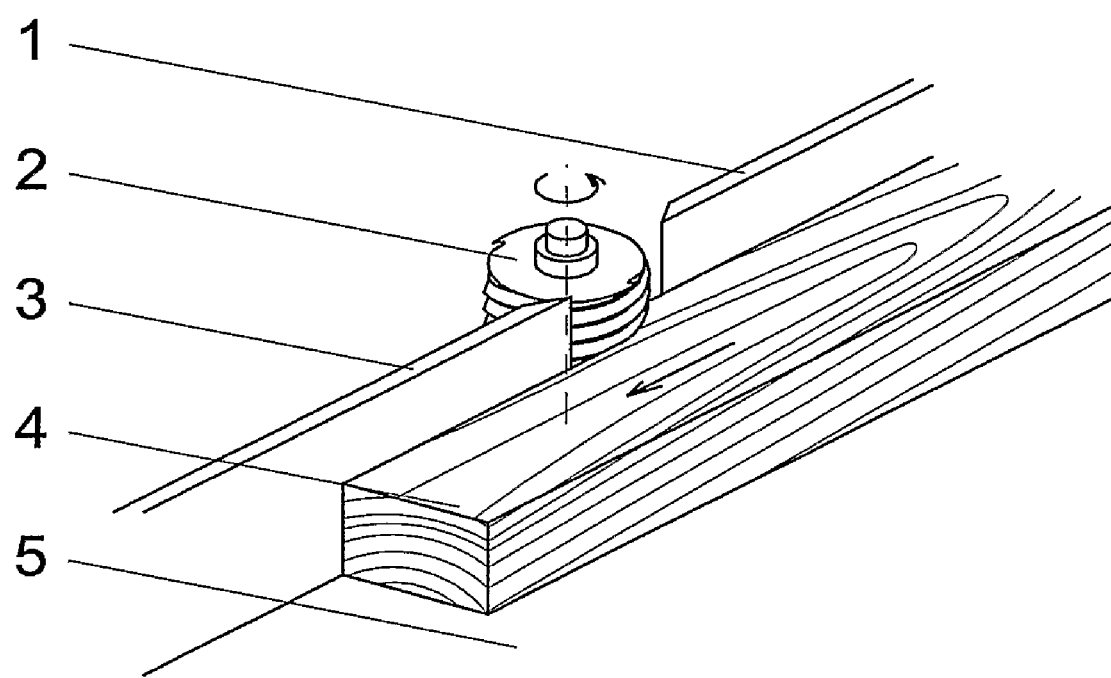
FIG. 1 a milling table with cylindrical cutter according to the invention.

In FIG. 1 the cylindrical cutter 1 according to the invention is shown in use. It is mounted on a tool receptacle penetrating the machine table 5 and is driven by a motor with belt drive, not illustrated, in the rotational direction indicated by the arrow. The workpiece 4 to be machined is positioned on the machine table 5 and forced against the stop 3 and pushed in the direction of the arrow. By means of the cylindrical cutter a longitudinal side of the workpiece is machined. The chips are removed primarily in the downward direction.

Figure 3:
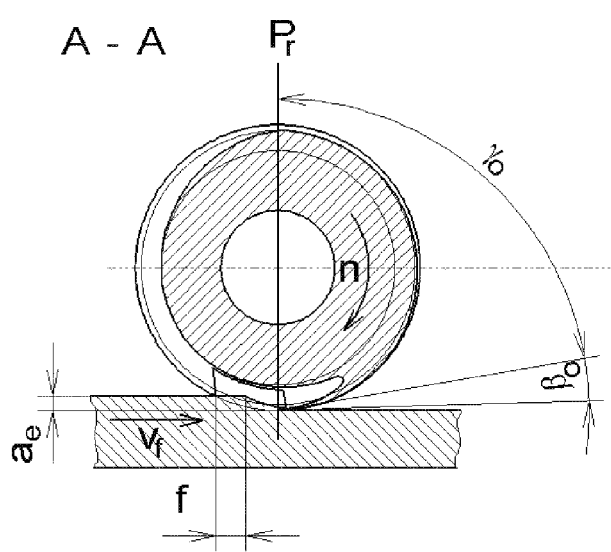
FIG. 3 the section A-A according to FIG. 2.
Figure 2:
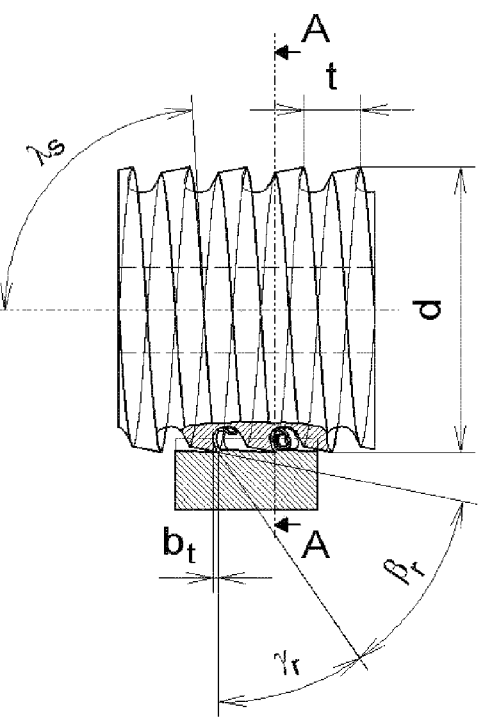
FIG. 2 a side view of a cylindrical cutter according to the invention with a detail of a longitudinal section in the $P_r$ plane for the illustrated three cutting edge points.

In FIGS. 2 and 3 the cylindrical cutter according to the invention is illustrated in two views. These figures serve primarily for explaining the cutting edge angles.

FIG. 3 shows the section A-A. This section in accordance with the definitions of DIN 6581 is located in the tool orthogonal plane $P_o$ of an observed cutting edge point, i.e., in FIG. 3 $P_o$ is in the plane of the drawing sheet. In FIG. 3, the tool reference plane $P_r$ in section is illustrated as a line. It extends through the axis of the cylindrical cutter and through the cutting edge point shown in section and is perpendicular to $P_o$. In FIG. 2, this plane for the observed cutting edge points illustrated in the detail view is in the plane of the drawing sheet.

In FIG. 3, the tool orthogonal angle $\beta_o$ and the tool orthogonal rake angle $\gamma_o$ are measured and illustrated according to DIN 6581. As an example, the tool orthogonal rake angle $\gamma_o$ is the angle between the tool reference plane $P_r$ and the rake face $A_\gamma$ relative to the tool orthogonal plane $P_o$. In FIG. 2 a rake angle $\gamma_r$ and a wedge angle $\beta_r$—not defined in DIN 6581—are shown wherein $\gamma_r$ is the angle between the tool orthogonal plane $P_o$ of the tool and the rake face $A_\gamma$. The tool orthogonal plane $P_o$ is positioned in FIG. 2 parallel to the section plane A-A and perpendicular to the drawing plane and extends through the cutting edge point (here the tip of the angles $\gamma_r$ and $\beta_r$).

Between these angles the following relationships are present.

$$\gamma_o = \arctan(\tan\lambda_s \cdot \tan\gamma_r)$$

$$\beta_o = \arctan(\tan\lambda_s \cdot \tan\gamma_r) - \arctan\left[\frac{\tan(90° - \beta_o - \gamma_r)}{\tan\lambda_s}\right]$$

FIGS. 2 and 3 show in addition to the already represented parameters the tool diameter d, the working engagement $a_e$, the feed speed $v_f$, the feed f, the tool rotary speed n, the pitch t, the cutting width for each engagement area $b_t$ and the helix angle $\lambda_s$ of the tool.

Figure 4:
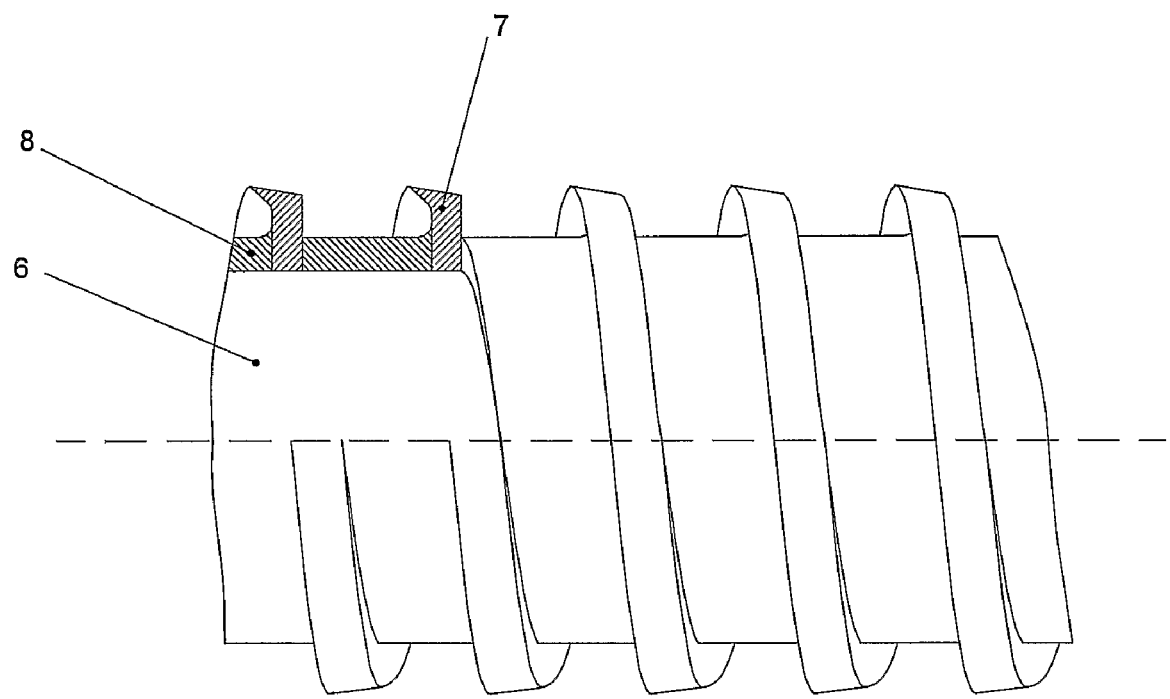
FIG. 4 a cylindrical cutter with removable cutting edge in accordance with the invention.
Figure 5:
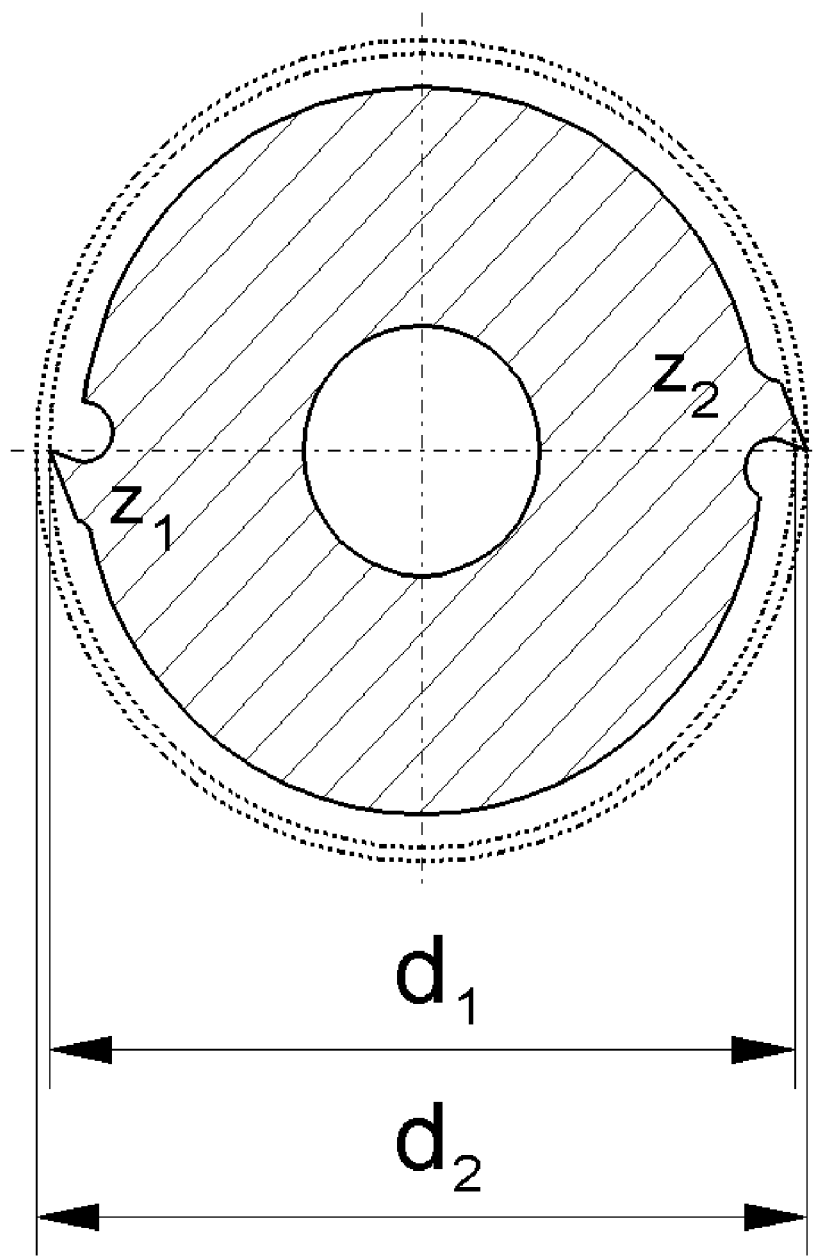
FIG. 5 shows a cutter that has a first cutting edge $z_1$ and a second cutting edge $z_2$ wherein the outer diameter $d_2$ of the cutting edge $z_2$ is greater than the outer diameter $d1$ of the cutting edge $z_1$.

FIG. 4 shows a cylindrical cutter with detachable cutting edge. The cutting blade 7 winds in a helical shape about the tool base member 6. A helical spacer 8 is interposed for maintaining the pitch and for fastening. For attachment, the cutting edge 7 and the spacer 8 can be tightened against a collar connected to the base member 6 by means of a nut at the end face. FIG. 4 is purely schematic. The nut and the collar are not shown.

What is claimed is:

1. Cylindrical cutter for machining wood, wooden materials and plastics, the cylindrical cutter comprising at least one helical cutting edge, wherein a helix angle $\lambda_s$ of the at least one cutting edge is in a range of 70° to close to 90°, a rake angle $\gamma_r$ of the at least one cutting edge between a tool orthogonal plane $P_o$ of the cylindrical cutter and a rake face $A_\gamma$—measured in a tool reference plane $P_r$ of the cylindrical cutter—is at least 5°, and a wedge angle $\beta_r$ between the rake face $A_\gamma$ and a flank $A_\alpha$—measured in the tool reference plane $P_r$—is 45° to 65°.

2. Cylindrical cutter according to claim 1, wherein the helix angle $\lambda_s$ of the at least one cutting edge is in a range of 80° to 88°.

3. Cylindrical cutter according to claim 1, wherein at least two of the at least one helical cutting edge are provided that extend parallel to one another, wherein at least one of said at least two helical cutting edges has a diameter that is different from a diameter of the other helical cutting edges.

4. Cylindrical cutter according to claim 1, comprising a tool base member, wherein the at least one helical cutting edge is in the form of a helically bent detachable blade that is detachable from the tool base member.

5. Cylindrical cutter according to claim 4, further comprising at least one helically bent spacer arranged between turns of the at least one cutting edge.

6. Cylindrical cutter according to claim 5, wherein the at least one cutting edge and the at least one spacer are axially clamped relative to one another.

7. Cylindrical cutter according to claim 5, wherein the at least one spacer is detachable from the tool base member.

8. Cylindrical cutter according to claim 4, wherein the detachable blade has lateral stop collars.

9. Cylindrical cutter according to claim 4, comprising a tool base member, wherein the detachable blade is guided in a groove of the tool base member.

10. Cylindrical cutter according to claim 4, wherein the at least one helical cutting edge is tightened by relative rotation of the tool base member.

11. Cylindrical cutter according to claim 1, wherein the at least one cutting edge is initially detachable and fastened to a tool base member by gluing, soldering, or other material bonding.

12. Cylindrical cutter according to claim 1, wherein at least two of the at least one cutting edge are interposed and have different helix angles.

13. Cylindrical cutter according to claim 1, wherein a helical cutting line of the at least one cutting edge is interrupted.

* * * * *